Patented Nov. 5, 1946

2,410,408

UNITED STATES PATENT OFFICE 2,410,408

STABILIZATION OF VINYL COMPOUNDS

John R. Durland, Nitro, W. Va., assignor to Monsanto Chemical Company, St. Louis, Mo., a corporation of Delaware No Drawing. Application March 1, 1944,
Serial No. 524,637

8 Claims. (Cl. 260—666.5)

The present invention relates to the stabilization of vinyl compounds and to the stabilized compositions so produced.

It is well known that vinyl compounds as for example vinyl esters, and vinyl aromatic compounds such as styrene, its homologues and analogues tend to polymerize on standing. In the manufacture of vinyl polymers premature polymerization even to a very slight extent may render the monomer unfit for use since it may seriously affect the properties of the finally polymerized product. For this and other reasons it is essential to prevent premature polymerization and for this purpose it is common practice to add an inhibiting agent to the liquid monomer. An object of this invention is to provide a new and improved class of inhibiting agents.

A further object of the invention is to provide a class of cheap materials which are effective inhibiting agents. A still further object is to provide a class of inhibiting agents which are easily removable from the liquid monomer after which the polymerization reaction can be carried out in a normal manner. Other and further objects will be apparent from the description following.

In accordance with this invention it has been found that phenolic sulfides effectively inhibit the polymerization of vinyl compounds during storage, shipment and distillation. The monosulfides are the most effective and are therefore preferred but higher sulfides as for example disulfides and polysulfides of phenols can be used with good results. One or more hydroxy groups may be present in the aromatic nucleus as well as other substituents such as alkoxy, alkyl and halogen groups. In general, the phenolic sulfides possess the type formula $(OH)_n R-S_x-R(OH)_n$ where $x$ and $n$ are integers or polymers of this nucleus, $(OH)_n R-S_x-R(OH)_n-S_x-R(OH)_n$, etc.

Typical examples of phenolic sulfides which can be used in the practice of this invention comprise the following: di-(o-benzyl phenol) monosulfide; di-(p. t-butyl catechol) monosulfide; di-carvacrol monosulfide; di-catechol disulfide; di-catechol monosulfide; di-m-cresol monosulfide; di-o-cresol monosulfide; di(di-t-butyl catechol) monosulfide; di-β-hydroxy naphthyl disulfide; di-phenol monosulfide; di-thymol monosulfide; monosulfide of catechol monobenzyl ether; di-hydroquinone disulfide and di(2-methyl, 4 t-butyl) phenol disulfide. All of the foregoing compounds have been found to possess marked inhibiting action when incorporated into monomeric styrene. It is to be understood that the above are merely illustrative of the invention and other phenolic sulfides can be used where convenient or desirable.

The phenolic sulfides do not discolor vinyl compounds and are therefore eminently suitable for incorporating into the compositions prior to storage. In addition, they are effective at elevated temperatures as for example 100° C.–200° C. as well as at storage temperatures and effectively prevent polymerization during distillation. They are easily removed during distillation of the vinyl compound and in no way affect the polymerization of the distilled products. The amount of inhibitor to be used will of course vary according to the particular composition and conditions under which it is to be used but in general proportions within the range of 0.001 to 5% are satisfactory. Often the merest traces are sufficient to prevent polymerization entirely.

Among vinyl monomers which can be preserved by incorporating therein a phenolic sulfide are vinyl acetate, divinyl benzene, α-methyl styrene, p-methyl styrene, ethyl vinyl benzene, vinyl naphthalene, p-chloro styrene and the like.

As specific examples of the invention which illustrate the inhibiting power of phenolic sulfides but which are not to be taken as limitative of the invention, 0.250 part by weight of inhibitor was charged with 25 parts by weight of freshly distilled styrene into screw cap bottles of suitable capacity having the caps lined with tin foil. The samples were then immersed in a boiling water bath for a total of 20 hours. Viscosity tests were then made at 25° C. with a 10 ml. analytical pipette measuring the time of flow from the upper mark to a lower mark just below the bulb. For monomeric styrene the time of flow was 11.5 seconds. The viscosities in the table below are expressed as relative values with monomeric styrene as one. As a further measure of the inhibiting action the polystyrene content was determined by distillation.

| Inhibitor | Relative viscosity | Polystyrene, percent |
|---|---|---|
| Di-(p. t-butyl catechol) monosulfide | 1.01 | 0.30 |
| Di-catechol monosulfide | 1.02 | 0.45 |
| Di-m-cresol monosulfide | 1.02 | 0.85 |
| Di-o-cresol monosulfide | 1.10 | 0.50 |
| Di-thymol monosulfide | 1.03 | 0.90 |
| Monosulfide of catechol monobenzyl ether | 1.00 | 0.05 |

By way of comparison styrene without an inhibitor was too viscous for test after heating for the same length of time.

Storage tests were carried out employing phenolic sulfides as storage inhibitors. Freshly distilled styrene was stored in the dark at approximately 25° C. in contact with 24 gauge sheet steel. 0.01% of inhibitor was incorporated into the styrene and samples tested periodically for increase in viscosity. The condition of the styrene showed no change after many months storage. The results are summarized below:

| Inhibitor | Time of storage | Condition of composition |
| --- | --- | --- |
| None | 2 weeks | Viscous liquid. |
| Do | 6 weeks | Solid. |
| Di-(p, t-butyl catechol) monosulfide | 10 months | No apparent change. |
| Di-m-cresol monosulfide | 10 months | Do. |
| Di-o-cresol monosulfide | 10 months | Do. |
| Di-thymol monosulfide | 10 months | Do. |
| Di-t-butyl m-cresol monosulfide | 10 months | Do. |
| Di-carvacrol monosulfide | 10 months | Do. |

It was further noted that the addition of the inhibitor caused no discoloration and after ten months storage the styrene compositions containing the inhibitor were still perfectly colorless watery liquids. These results show that very small proportions of phenolic sulfides effectively preserve styrene during storage. In this connection, mention should be made of the fact that the inhibitors may be employed in proportion sufficient to stabilize the vinyl compound at room temperature, or thereabout, but in proportion insufficient to stabilize the composition at elevated temperature in which case the stabilizing agent need not be removed. The composition may when desired be heated to produce polymeric products without removal of the stabilizing agent.

Again, the invention is not limited to the compositions set forth to illustrate the invention. Other polymerizable vinyl compounds can be stabilized with the new inhibitors and other phenolic sulfides used. The method of adding the inhibitor can be varied widely. This invention is limited solely by the claims attached hereto as part of the present specification.

What is claimed is:

1. A liquid composition comprising a styrene monomer and a proportion of a monosulfide of a dihydric phenol sufficient to inhibit polymerization.

2. A liquid composition comprising a styrene monomer and a proportion of a monosulfide of a monohydrocarbon substituted dihydric phenol sufficient to inhibit polymerization.

3. A liquid composition comprising styrene monomer and a proportion of a di-(p-tert. butyl catechol) monosulfide sufficient to inhibit polymerization.

4. A liquid composition comprising styrene monomer and a proportion of di-catechol monosulfide sufficient to inhibit polymerization.

5. The method of preventing polymerization of a styrene monomer which comprises incorporating therein a proportion of a monosulfide of a dihydric phenol sufficient to inhibit polymerization.

6. The method of preventing polymerization of a styrene monomer which comprises incorporating therein a proportion of a monosulfide of a monohydrocarbon substituted dihydric phenol sufficient to inhibit polymerization.

7. The method of preventing polymerization of styrene monomer which comprises incorporating therein a proportion of di-(p-tert. butyl catechol) monosulfide sufficient to inhibit polymerization.

8. The method of preventing polymerization of styrene monomer which comprises incorporating therein a proportion of di-catechol monosulfide sufficient to inhibit polymerization.

JOHN R. DURLAND.